US00RE46411E

(19) United States
(12) Reissued Patent
Chu

(10) Patent Number: US RE46,411 E
(45) Date of Reissued Patent: May 23, 2017

(54) TRIGGER ASSEMBLY

(71) Applicant: Man Kung Enterprise Co., Ltd., Taichung (TW)

(72) Inventor: Fu-Hui Chu, Taichung (TW)

(73) Assignee: Man Kung Enterprise Co., Ltd., Taichung (TW)

(21) Appl. No.: 14/837,155

(22) Filed: Aug. 27, 2015

Related U.S. Patent Documents

Reissue of:
(64) Patent No.: 8,522,761
Issued: Sep. 3, 2013
Appl. No.: 13/356,659
Filed: Jan. 24, 2012

(51) Int. Cl.
*F41B 5/12* (2006.01)
*F41A 17/46* (2006.01)
*F41A 19/10* (2006.01)

(52) U.S. Cl.
CPC ..... *F41A 17/46* (2013.01); *F41A 19/10* (2013.01)

(58) Field of Classification Search
CPC ..... F41B 5/123; F41B 7/046; F41B 5/1469; F41A 17/46; F41A 19/10
USPC ..... 124/25, 31, 40
See application file for complete search history.

(56) References Cited

U.S. PATENT DOCUMENTS 4,192,281 A * 3/1980 King ..... 124/25
4,877,008 A * 10/1989 Troubridge ..... 124/25
5,085,200 A * 2/1992 Horton-Corcoran et al. .. 124/25
5,598,829 A * 2/1997 Bednar ..... F41A 17/28 124/25
5,649,520 A * 7/1997 Bednar ..... 124/25
5,884,614 A * 3/1999 Darlington ..... F41B 5/1469 124/25
6,425,386 B1 * 7/2002 Adkins ..... F41B 5/12 124/25
6,736,123 B1 * 5/2004 Summers et al. ..... F41A 17/46 124/25
6,802,304 B1 * 10/2004 Chang ..... F41B 5/1469 124/25
7,588,022 B2 * 9/2009 Chang ..... 124/25
2009/0064978 A1 * 3/2009 Matasic ..... F41B 5/12 124/35.1

* cited by examiner

*Primary Examiner* — Jeffrey R Jastrzab
(74) *Attorney, Agent, or Firm* — Alan D. Kamrath; Kamrath IP Lawfirm, P.A.

(57) ABSTRACT

A trigger assembly includes a body having a pivot, and a hook is mounted to the pivot. The body has a chamber, and a path communicates with the chamber. A first positioning unit is located in the path, and a safety member is located in the chamber which has two slots [and the]. *The* first positioning unit contacts the slots. An activation member is located on the top of the safety member and has a guide groove and a positioning hole. A guide rod on the safety member is located in the guide groove. A second positioning unit is located in the body and contacts the positioning hole. A pivotal member is pivotably connected to the body and has an end contacting a push portion of the activation member. A spring is mounted to the protrusion and contacts the inside of the body. The trigger assembly includes two safety protections.

20 Claims, 9 Drawing Sheets

TRIGGER ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to a trigger assembly, and, more particularly, to a trigger assembly with two safety units.

BACKGROUND OF THE INVENTION

A conventional trigger assembly is shown in FIG. 9 and generally includes a body "A" in which an activation plate A1 is slidably inserted therein which has two positioning recesses A11 in the top thereof, and each positioning recess A11 has a positioning member A2 received therein. A safety plate A3 is pivotably connected in the body "A", and a pivotable member A4 is pivotably connected in the body "A" and located close to the safety plate A3. The free end of the pivotable member A4 is connected to the body "A" by a spring A5, and a trigger A6 is connected to the lower side of the body "A". The trigger assembly is used to shoot arrows.

However, the conventional trigger assembly does not have two safety units, so that when the arrow is in position, the safety plate A3 and the activation plate A1 are moved backward. The pivotably member A4 is lowered because of the force from the spring A5. If the user unintentionally pulls the trigger A6, the arrow may touch the rear end of the pivotable member A4 and generates *a* huge noise which may scare the user.

The present invention intends to provide a trigger assembly which improves the shortcomings of the conventional trigger assembly.

SUMMARY OF THE INVENTION

The present invention relates to a trigger assembly and comprises a body having a presser and a trigger pin located at the lower side of the body. A trigger is pivotably connected to the body by the trigger pin and has a contact portion formed on the top of one side thereof. A pin contacts the contact portion, and a trigger spring is mounted to the pin. A free end of the trigger spring contacts the body which has a pivot located close to the trigger pin. A hook is mounted to the pivot and has a resilient member connected thereto. A cap is securely connected to one side of the body. The body has a chamber, and a path communicates with the chamber. A first positioning unit is located in the path, and a safety member is located in the chamber. The safety member has two slots defined in the underside thereof. The first positioning unit contacts the slots. A guide rod protrudes front the top of the safety member. An activation member is located on the top of the safety member and has a guide groove and a positioning hole. The guide rod is located in the guide groove. A second positioning unit is located in the body and contacts the positioning hole. A pivotal member is pivotably connected to the body and located close to the hook. The pivotal member has an end contacting a push portion on the top of the activation member. A protrusion extends from the top of the pivotal member, and a spring is mounted to the protrusion. A free end of the spring contacts the inside of the body.

Preferably, the resilient member is a spring.

Preferably, the first and second positioning units are a bead and a spring respectively.

Preferably, the second positioning unit has a bolt connected to the top thereof.

Preferably, the body has a gauge on the top thereof.

Preferably, the body has an adjustment button on the side thereof.

Preferably, the pivotal member has a lever connected thereto.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
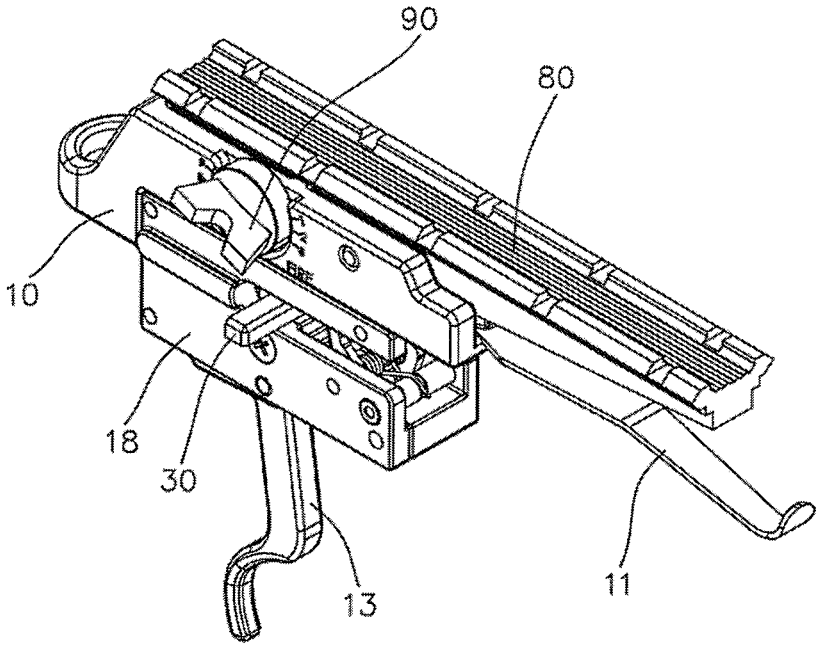
FIG. 1 is a perspective view to show the trigger assembly [or] *of* the present invention.
Figure 2:
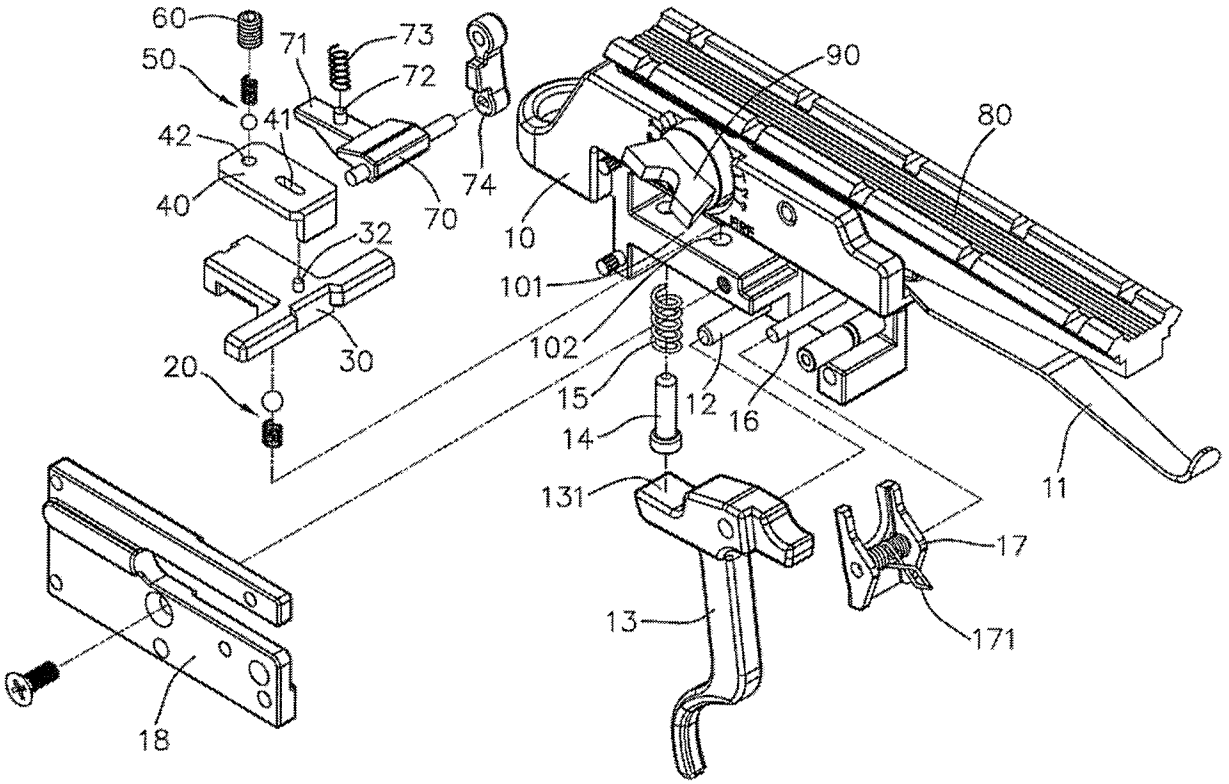
FIG. 2 is an exploded view to show the trigger assembly of the present invention.
Figure 3:
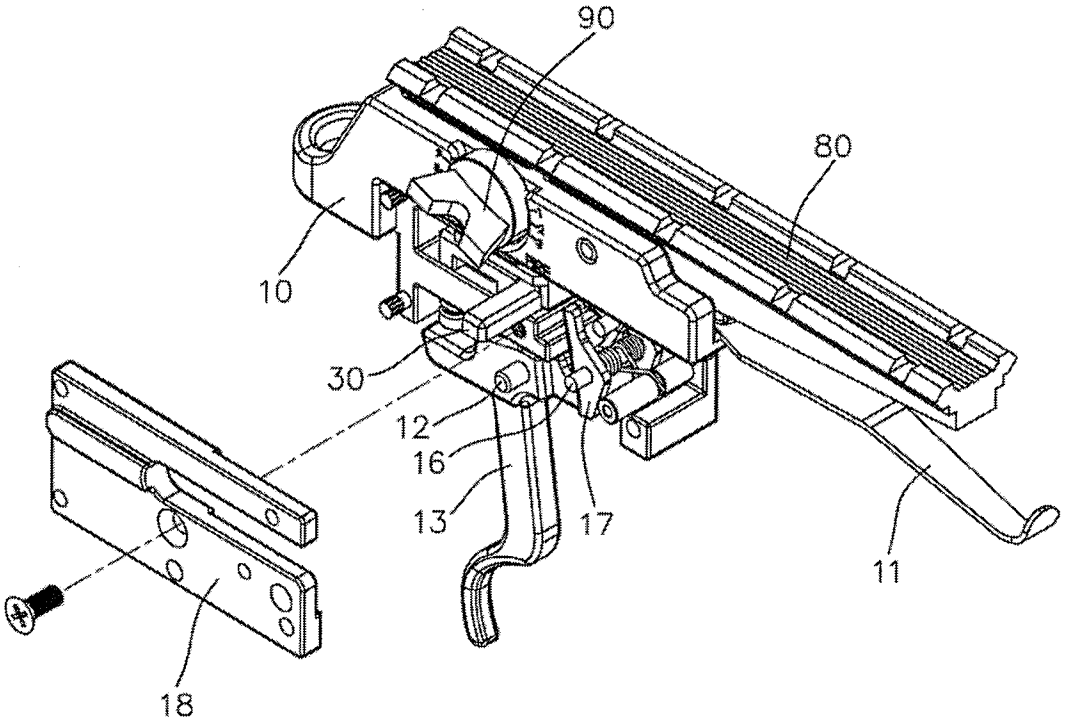
FIG. 3 is a partial exploded view of the trigger assembly of the present invention.
Figure 4:
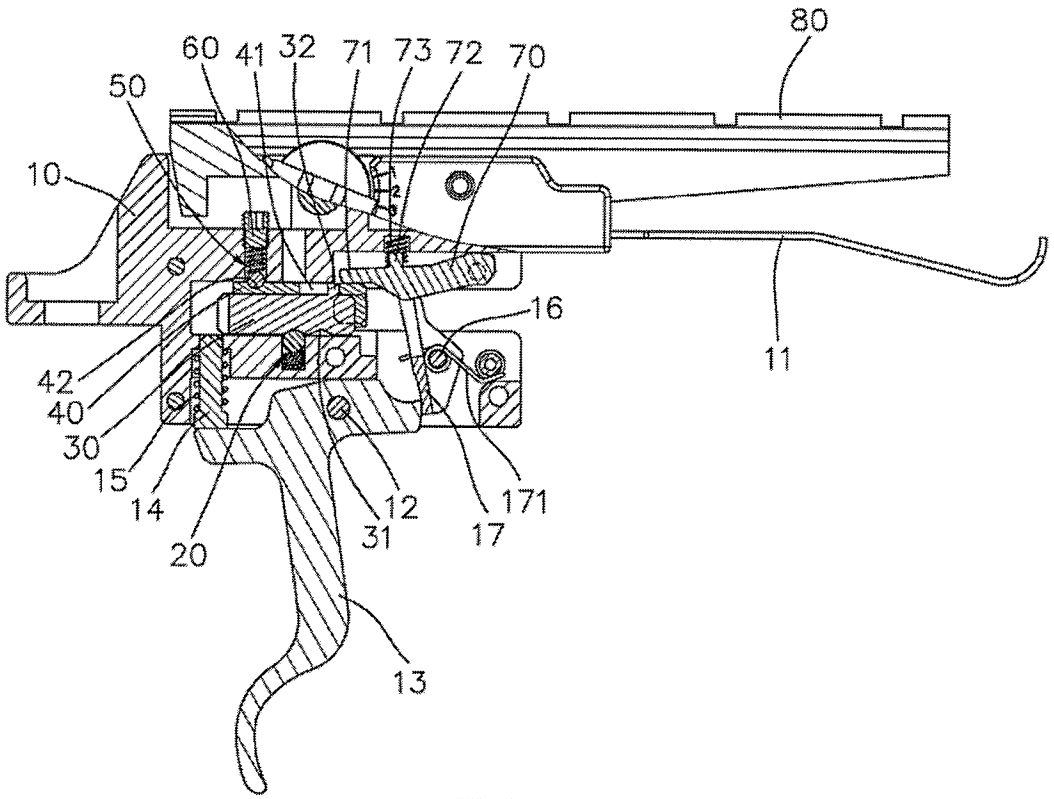
FIG. 4 is a partial cross sectional view of the trigger assembly of the present invention.
Figure 5:
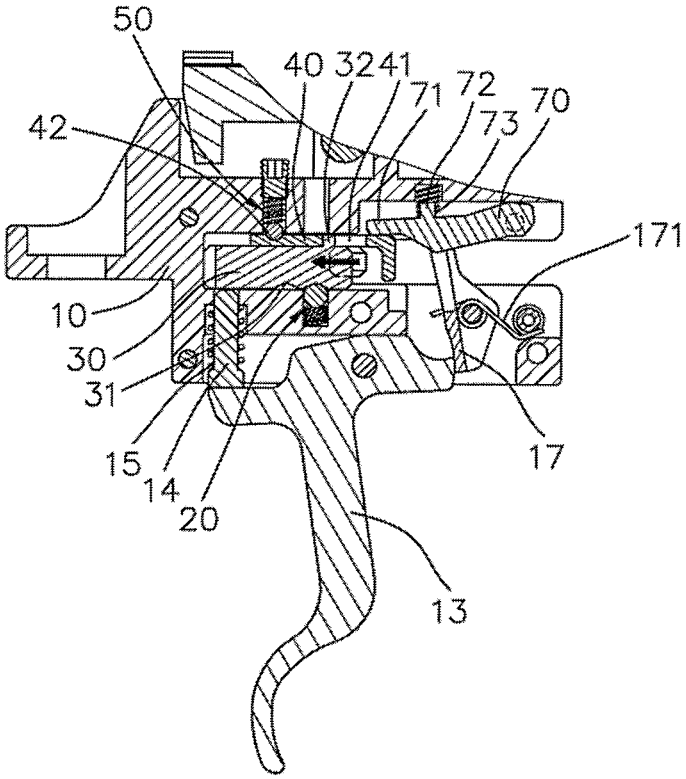
FIG. 5 is a cross sectional view of the trigger assembly of the present invention.

Referring to FIGS. 1 to 8, the trigger assembly [or] *of* the present invention comprises a body 10 having a presser 11 and a trigger pin 12 located at the lover side of the body 10. A trigger 13 is pivotably connected to the body 10 by the trigger pin 12[.] and has a contact portion 131 formed on the top of one side thereof. A [phi] *pin* 14 contacts the contact portion 131, and a trigger spring 15 is mounted to the pin 14. A free end of the trigger spring [1] *15* contacts the body 10 which has a pivot 16 located close to the trigger pin 12. A hook 17 is mounted to the pivot 16 and has a resilient member 171 connected thereto. A cap 18 is securely connected to one side of the body 10, so that the trigger 13 and the hook 17 do not drop from the body 10.

The body 10 has a chamber 101, and a path 102 communicates with the chamber 101. A first positioning unit 20 is located in the path 102, and a safety member 30 is located in the chamber 101. The safety member 30 has two slots 31 defined in the underside thereof, and the first positioning unit 20 contacts the slots 31. A guide rod 32 protrudes from the top of the safety member 30. An activation member 40 is located on the top of the safety member 30 and has a guide groove 41 and a positioning hole 42. The guide rod 32 is located in the guide groove 41. [The] *A* second positioning[.] unit 50 has a bolt 60 connected to a top thereof. [A] *The* second positioning unit 50 is located in the body 10 and contacts the positioning hole 42. A pivotal member 70 is pivotably connected to the body 10 and located close to the hook 17. The pivotal member 70 has an end [normally contacting] *forming* a push portion 71 *contacting* on the top of the activation member 40. A protrusion 72 extends from the top of the pivotal member 70, and a spring 73 is mounted to the protrusion 72. A free end of the spring 73 contacts the inside of the body 10.

In this embodiment, the resilient member 171 is a spring, and the first and second positioning units 20, 50 are a bead and a spring respectively.

The body 10 has a gauge 80 on the top thereof, and an adjustment button 90 is located on one side of the body 10. The pivotal member 70 has a lever 74 connected thereto.

Figure 6:
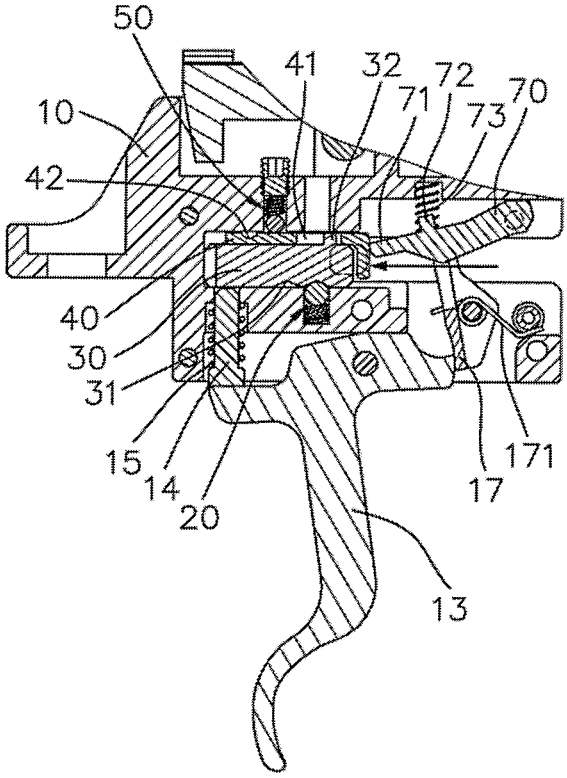
FIG. 6 is a cross sectional view to show the trigger assembly of the present invention, wherein the bow string is positioned.
Figure 7:
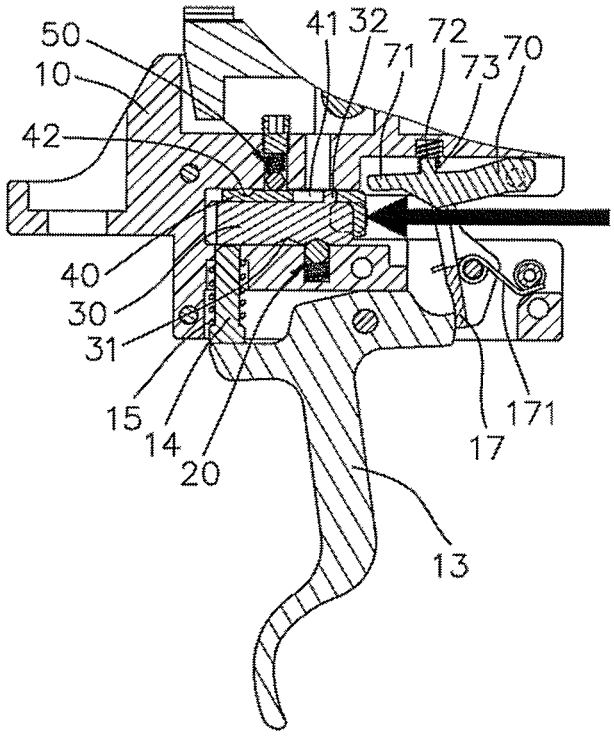
FIG. 7 is a cross sectional view to show the trigger assembly of the present invention, wherein the arrow is positioned.
Figure 8:
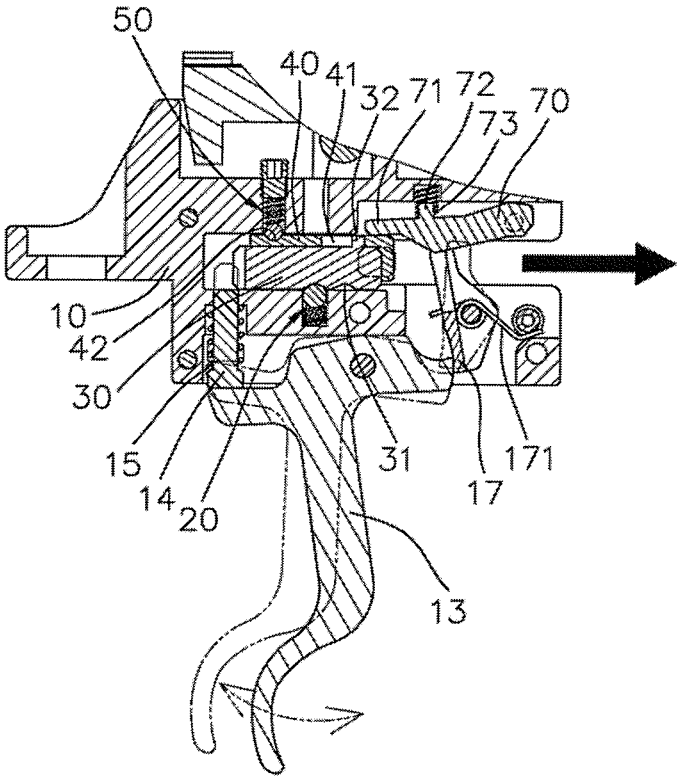
FIG. 8 is a cross sectional view to show the trigger assembly of the present invention, wherein the trigger is pulled[.]*.
Figure 9:
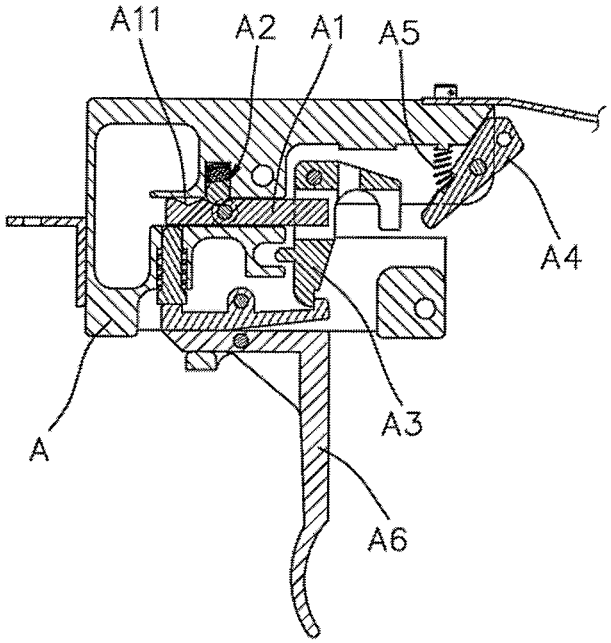
FIG.9 (PRIOR ART)
* and FIG. 9 is a cross sectional view to show the conventional trigger assembly.

When not in operational status, the second positioning unit 50 is positioned to the positioning hole 42, and the first positioning unit 20 is positioned to the slot 31 of the safety member 30. When the safety member 30 is moved back and locked as shown by the arrowhead in FIG. 5, the [how] *bow* string pushes the activation member 40 to remove the second positioning[.] unit 50 from the positioning hole 42, and the activation member 40 is moved backward. The safety member 30 performs as a "switch" to lock the trigger assembly as shown in FIG. 6. When the arrow (not shown) is installed, the push portion 71 of the pivotal member 70 is pushed by the arrow, and the activation member 40 is not activated, so that the "switch" is opened as shown in FIG. 7. When the trigger 13 is pulled, the pivotal member 70 moves forward to shoot the arrow, and the activation member 40 contacts the pivotal member 70 as shown in FIG. 8. Therefore, the shooting processes are completed. The present invention involves fewer parts and has two safety protections to avoid the huge noise due to [that] the user unintentionally [touches] *touching* the trigger.

While [we have shown and described] the embodiment in accordance with the present invention *has been shown and described*, it should be clear to those skilled in the art that further embodiments may be made without departing from the scope of the present invention.

What is claimed is:

1. A trigger assembly comprising: a body having a presser [and], a trigger pin located at a lower side [or] *of* the body, a trigger pivotably connected to the body by the trigger pin and having a contact portion formed on a top of one side thereof, a pin contacting the contact portion [and], a trigger spring mounted to the pin, *with* a free end of the trigger spring contacting the body which has a pivot located close to the trigger pin, a hook mounted to the pivot and having a resilient member connected thereto, a cap securely connected to a side of the body, *with* the body having a chamber and a path communicating with the chamber, a first positioning unit located in the path [and], a safety member located in the chamber, *with* the safety member having two slots defined in an underside thereof, *with* the first positioning unit contacting the *two* slots, a guide rod protruding from a top of the safety member, an activation member located on the top of the safety member and having a guide groove and a positioning hole, *with* the guide rod located in the guide groove, a second positioning unit located in the body and contacting the positioning hole, a pivotal member pivotably connected to the body and located close to the hook, *with* the pivotal member having an end [contacting] *forming* a push portion *contacting* on a top of the activation member, a protrusion extending from a top of the pivotal member, and a spring mounted to the protrusion, *with* a free end of the spring contacting an inside of the body.

2. The trigger assembly as claimed in claim 1, wherein[.] the resilient member is a spring.

3. The trigger assembly as claimed in claim 1, wherein [die] *the* first and second positioning units are a bead and a spring respectively.

4. The trigger assembly as claimed in claim 1, wherein the second positioning unit has a bolt connected to a top thereof.

5. The trigger assembly as claimed in claim 1, wherein the body has a gauge on [the] *a* top thereof.

6. The trigger assembly as claimed in claim 1, wherein the body has an adjustment button on a side thereof.

7. The trigger assembly as claimed in claim 1, wherein the pivotal member has a lever connected thereto.

*8. A trigger assembly comprising: a body having a chamber and a presser; a trigger pin located at a lower side of the body; a trigger pivotally connected to the body by the trigger pin and having a contact portion formed on a top of one side thereof; a safety member moveable in the chamber; a pin contacting the contact portion of the trigger and moveable in the body to extend into the chamber behind the safety member and to not interfere with movement of the safety member in the chamber; and a pivotal member pivotally connected to the body and having an end forming a push portion, with the push portion locatable in the chamber in a first position in front of the safety member opposite to the pin and in a second position not interfering with the movement of the safety member.*

*9. The trigger assembly as claimed in claim 8, wherein the pivotal member has a lever connected thereto.*

*10. The trigger assembly as claimed in claim 9, further comprising a spring contacting the body and the pivotal member.*

*11. The trigger assembly as claimed in claim 10, further comprising a hook, wherein the body includes a pivot, with the hook mounted to the pivot and having a resilient member.*

*12. The trigger assembly as claimed in claim 11, further comprising a trigger spring mounted to the pin and having a free end contacting the body.*

*13. The trigger assembly as claimed in claim 12, further comprising a first positioning unit, with the safety member having two slots defined in an underside thereof with the first positioning unit contacting the two slots.*

*14. The trigger assembly as claimed in claim 13, further comprising an activation member located on top of the safety member and having a positioning hole; and a second positioning unit located in the body and contacting the positioning hole.*

*15. A trigger assembly comprising: a body having a chamber and a presser; a trigger pivotally mounted to the body; a safety member moveable in the chamber; a pin contacting the contact portion of the trigger and moveable in the body to extend into the chamber behind the safety member and to not interfere with movement of the safety member in the chamber; a pivotal member pivotally connected to the body and having an end forming a push portion, with the push portion locatable in the chamber in a first position in front of the safety member opposite to the pin and in a second position not interfering with the movement of the safety member; an activation member located on top of the safety member; and a guide rod protruding from the top of the safety member; wherein the activation member has a guide groove, with the guide rod located in the guide groove.*

*16. The trigger assembly as claimed in claim 15, further comprising a trigger pin located at a lower side of the body, with the trigger pivotally connected to the body by the trigger pin, with the trigger having a contact portion formed on a top of one side thereof, and with the pin contacting the contact portion.*

*17. The trigger assembly as claimed in claim 16, further comprising a cap securely connected to a side of the body.*

*18. The trigger assembly as claimed in claim 10, further comprising a protrusion extending from a top of the pivotal member, with the spring mounted to the protrusion.*

*19. The trigger assembly as claimed in claim 8, further comprising a spring contacting the body and the pivotal member.*

*20. A trigger assembly comprising: a body having a chamber and a presser; a trigger pivotally mounted to the body; a safety member moveable in the chamber; a pin contacting the contact portion of the trigger and moveable in the body to extend into the chamber behind the safety member and to not interfere with movement of the safety member in the chamber; a pivotal member pivotally connected to the body and having an end forming a push portion, with the push portion locatable in the chamber in a first position in front of the safety member opposite to the pin and in a second position not interfering with the movement of the safety member; a spring contacting the body and the pivotal member; and a protrusion extending from a top of the pivotal member, with the spring mounted to the protrusion.*

* * * * *